United States Patent [19]

Kutzli et al.

[11] Patent Number: 4,799,586
[45] Date of Patent: * Jan. 24, 1989

[54] WORKPIECE SUPPORT FOR AUTOMATED TOOLING

[75] Inventors: Carl R. Kutzli, Highland; James D. Rutter, Garden City, both of Mich.

[73] Assignee: Agnew Machine Company, Highland, Mich.

[*] Notice: The portion of the term of this patent subsequent to Jul. 8, 2003 has been disclaimed.

[21] Appl. No.: 860,457

[22] Filed: May 7, 1986

Related U.S. Application Data

[63] Continuation-in-part of Ser. No. 637,861, Aug. 6, 1984, Pat. No. 4,598,816.

[51] Int. Cl.⁴ .............................................. B65G 37/00
[52] U.S. Cl. .................................. 198/803.01; 269/56; 269/69; 198/345
[58] Field of Search ............... 198/465.1, 346.1, 379, 198/345, 803.01; 269/56, 69; 206/386, 595–600; 29/33 P, 563

[56] References Cited

U.S. PATENT DOCUMENTS

| | | | |
|---|---|---|---|
| 2,176,089 | 10/1939 | Malone | 269/287 |
| 2,392,169 | 1/1946 | Mansfield | 29/33 P |
| 3,148,873 | 9/1964 | Chandler | 269/71 |
| 3,540,566 | 11/1970 | Perry et al. | 198/344 |
| 3,543,392 | 12/1970 | Perry et al. | 29/563 |
| 4,014,428 | 3/1977 | Ossbahr | 198/472 X |
| 4,148,400 | 4/1979 | Cross | 198/648 |
| 4,159,762 | 7/1979 | Bulwith | 198/472 |
| 4,444,303 | 4/1984 | Burgess, Jr. | 198/472 X |
| 4,492,297 | 1/1985 | Sticht | 198/472 X |
| 4,494,282 | 1/1985 | Ida et al. | 198/472 X |
| 4,498,571 | 2/1985 | Nomura et al. | 29/33 P X |
| 4,598,816 | 1/1986 | Kutzli et al. | 198/465.1 |

FOREIGN PATENT DOCUMENTS

2487300 1/1982 France ........................ 206/596

Primary Examiner—Robert J. Spar
Assistant Examiner—D. Glenn Dayoan
Attorney, Agent, or Firm—Price, Heneveld, Cooper, DeWitt & Litton

[57] ABSTRACT

A fixture for supporting a workpiece during machining including an L-shaped, rigid, primary body member forming two panels or faces of the assembled fixture. The fixture also has two secondary panels which, when mounted to the primary body member, form a cube. The secondary body members are detachably mounted permitting their removal for the design and mounting of a workpiece frame within the fixture. One panel of the primary member has a device for clamping a workpiece support frame to the fixture. All external fixture locating and indexing devices are mounted on the primary member and are thereby permanently located with respect to each other.

7 Claims, 5 Drawing Sheets

WORKPIECE SUPPORT FOR AUTOMATED TOOLING

This application is a continuation-in-part of U.S. patent application Ser. No. 637,861 entitled METHOD AND MEANS FOR JIGGING WORKPIECE FOR MACHINING, filed Aug. 6, 1984 now U.S. Pat. No. 4,598,816.

FIELD OF THE INVENTION

This invention relates to the machining of parts, particularly complex parts requiring multiple, separate machining operations of the type in which the part is held stationary while the tool moves. More particularly, the invention relates to a novel workpiece or part mounting and transporting fixture and to the construction of the fixture to improve its accuracy and reusability.

BACKGROUND OF THE INVENTION

It has long been common practice in the manufacture of mass produced parts, such for example, as carburetor housings, automatic transmission housings, cylinder blocks and the like, to mount the part on a pallet, fixture or a jig and, while so mounted, move the part through a number of work stations. At each work station one or more machining operations are performed and the part is then transported to another work station where additional machining operations are also performed. The parts mounted on their pallets, fixtures or jigs are transported from work station to work station on conveyors and remain on the conveyor or a spur track of the conveyor at each work station. This arrangement has a number of drawbacks and limitations.

In our earlier application, we disclosed a system and a work piece holding cuboidal jig which is so designed that the workpiece will be positioned at each work station with a known reference point by which it can be automatically and quickly positioned accurately, with respect to the tool that is to work on it. While this system has proven itself to be capable of dependable repeatable accuracy not previously attained by any system, it did have the drawback that the fixtures frequently could not be reused when the production run of a particular type of part was over. Since the fixtures are relatively expensive, this represented a tooling cost which it would be desirable to reduce. Further, the ease and the speed with which one of the cuboidal fixtures can be prepared to properly support a workpiece would be improved if the interior of the fixture could be made more accessible without either adversely affecting the accuracy of the fixture or its strength to withstand the pressures and distortion creating loadings which are imposed upon these types of fixtures by the operation of the work cells at the machining stations and by the tools used to perform the machining functions. Particularly, is the latter a problem in modern machine shop practice because, to increase productivity, the rate at which machining operations are carried out has been materially increased, necessitating exertion of greater and greater tool pressure on the workpiece.

BRIEF DESCRIPTION OF THE INVENTION

Accessibility and reusability of the cuboidal type fixture has been improved by creation of a fixture having a pair of integral sides and a pair of removable sides. By this arrangement, the interior of the fixture is accessible from four of its six faces. However, this arrangement does not require the exterior locating and indexing means used on the cuboidal fixture to be replaced and restored to accuracy each time the fixture is taken apart for the purpose of working on the structure within the fixture. This is accomplished by providing an L-shaped member having a pair of sides integral with each other arranged as an L and constituting half of the fixture. These sides mount all of the indexing and positioning surfaces necessary to properly position the cube at the work station, irrespective of which face of the cube is to be presented to the machine tool. Thus, dismantling the cube by removal of two individual side panels does not destroy the integrity of the two remaining side panels and the indexing means mounted on them. Further, an improved mount has been developed to more positively position and hold the indexing blocks which control the rotational position of the cube about its vertical axis.

DESCRIPTION OF THE PREFERRED EMBODIMENT

Figure 1:
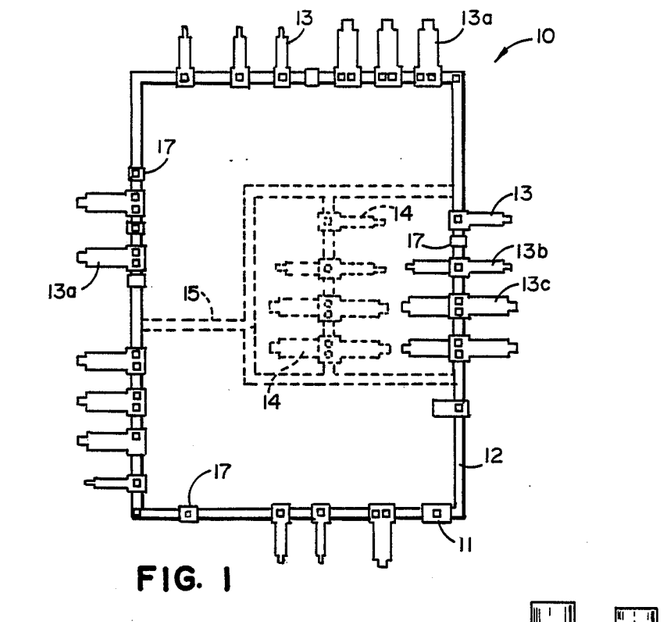
FIG. 1 is a schematic view of a part machining system of the type which utilizes this invention.

Referring to FIG. 1, the numeral 10 identifies a system of the type in which this invention is used. The system consists of an entry and removal station 11, a transport means 12 for the fixtures of this invention and a plurality of stations 13, arranged in an endless path which will ultimately return the fixture to station 11. The stations vary in type, stations 13 being capable of handling only a single fixture while stations 13a can handle two fixtures simultaneously. Some of the stations, such as 13b, are of the dual type in which machining is performed on a part from both sides while stations 13c are also dual approach stations but handle two fixtures simultaneously. Other than that, each station is specifically designed and equipped to position and rotate the fixtures 20 (FIG. 2) the tooling at the station which performs the actual machining on the workpiece is conventional. It will be noted in FIG. 1 that a number of additional stations 14 are illustrated in phantom and interconnected by a transport path 15 which bypasses a substantial section of the peripheral path 12 whereby parts having particular machining requirements can bypass much of the system and be specially processed and returned to station 11 fully machined. All of this is an arrangement fully described in our co-pending application, Ser. No. 637,861, of which this is a continuation-in-part.

Figures 3, 7, 11, 14:
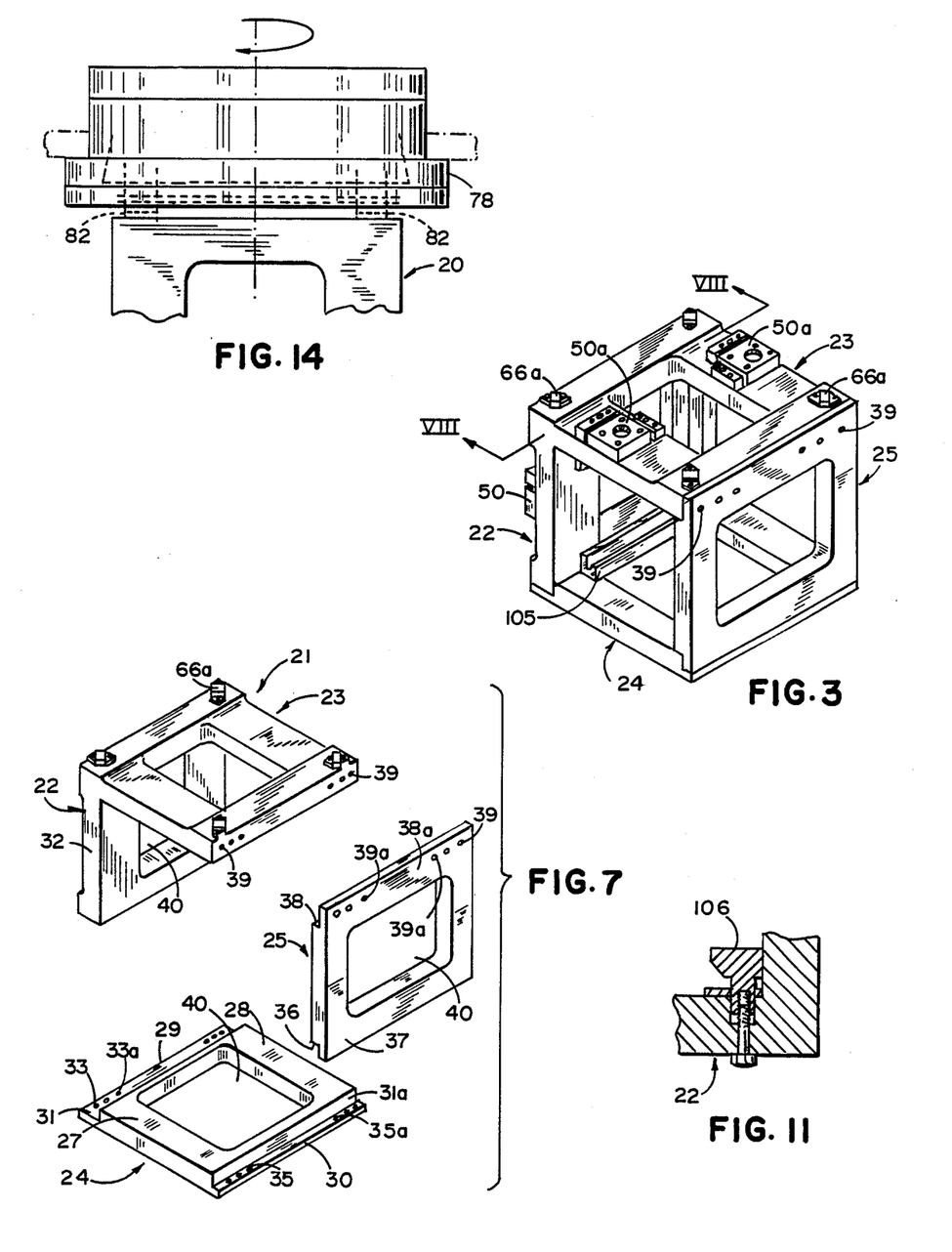
FIG. 3 is an oblique view of a fixture incorporating this invention.
FIG. 7 is an exploded view of the fixture with the work holding and positioning clamps omitted.
FIG. 11 is a fragmentary sectional view taken along the plane XI—XI of FIG. 8.
FIG. 14 is a fragmentary view of the head plate of a work cell engaged to a fixture of this invention.

The subject of this invention is the cuboidal fixture cage 20, illustrated in FIGS. 3, 5, 6 and 7. This fixture cage is a true cube having six faces, at least five of which, and if necessary, six are open to provide tool access to the workpiece mounted therein. The fixture of this invention consists of a primary or base L-shaped member 21 having a pair of legs, each of which forms one face or panel of the assembled cuboidal fixture. Thus, one leg of the base member 21 forms the panel 22 and the other forms the panel 23. These panels are integral with each other and preferably the member is a casting but can be a welded structure with each panel being a four sided figure the sides of which are of sufficient thickness that the panel and the overall member is rigid and capable of withstanding substantial side thrust and tool pressure. It is important that the member be capable of maintaining a very high degree of accuracy, thus, permitting repeated reuse without distortion and loss of accuracy. This is important to its use for mass produced parts requiring long production runs. It also must be capable of being refitted to accommodate parts of different design and machining requirements. This makes the fixture cage capable of use with relatively short run products as opposed to long run, mass produced products. The cuboidal fixture is completed by secondary panels 24 and 25 (FIG. 7). These panels are so constructed as to complete the cuboidal shape and are designed to have adequate strength to make the resulting fixture rigid and resistant to any type of deflection, even under severe tool pressure. The panel 24 has a pair of sides 27 and 28, and a pair of ends 29 and 30. Both ends 29 and 30 are notched to form recesses 31 and 31a. The recess 31 receives the lower end of the leg 32 of the base member 21. It is secured to the base member 21 by suitable means such as cap screws passing through the openings 33. The notch 31a is of lesser depth than the notch 31 because of the type of joint 35 formed with the bottom corner of the panel 25 (see FIG. 3).

The panel 25 is also notched at 36 so that it both seat in the notch 31a and has a flange 37 seating over the end of panel 24. The secondary panels are secured to each other by suitable fasteners such as cap screws mounted in the holes 35. The upper end of panel 25 is notched at 38 and provides a flange 38a which seats over the end of the panel 23 and is secured thereto by suitable fasteners such as cap screws mounted in the holes 39. This construction provides a lap joint at both ends of each of the secondary panels 24 and 25. Lap joints of this type provide a particularly strong and rigid structure resistant to twisting and distortion. The rigidity and accuracy of the joints between the panels can be increased by the use of dowel pins, openings for which are indicated at 33a, 35a and 39a.

Each of the panels has a tool access window 40. When the secondary panels 24 and 25 are bolted to the member 21, a rigid, cuboidal, deflection resistant fixture is formed having six, open, tool accessible sides. The result of this construction is a fixture which is square and when the secondary face panels 24 and 25 have been removed provides substantially unrestricted access to the interior of the fixture for mounting a workpiece.

Figure 4:
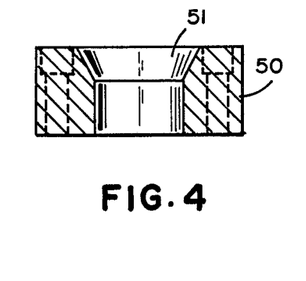
FIG. 4 is a central sectional view of one of the indexing blocks.
Figure 5:
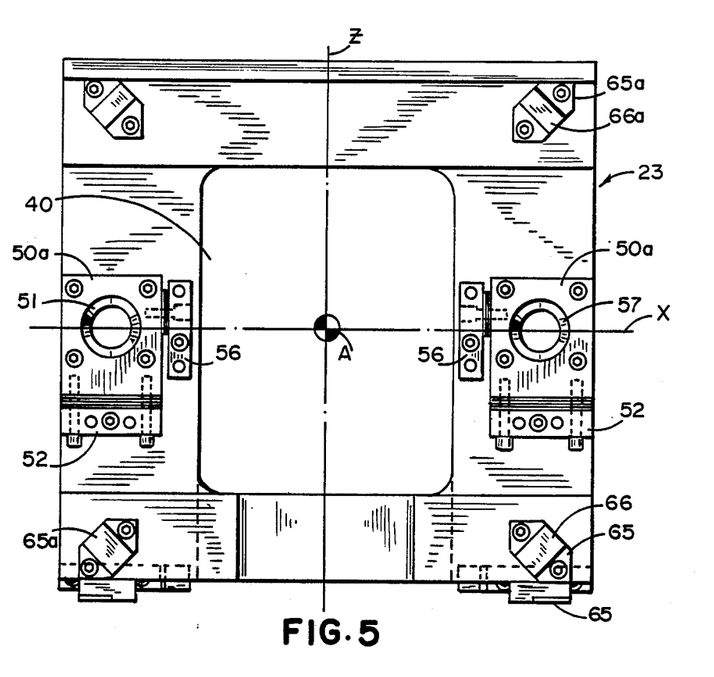
FIG. 5 is a view of one panel of the base member of the fixture.
Figure 6:
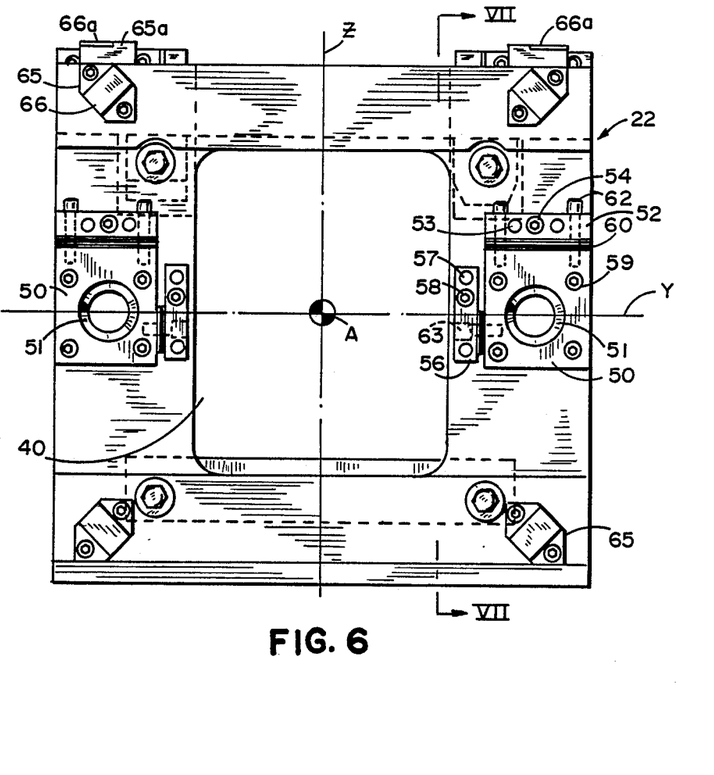
FIG. 6 is a view of the other panel of the base member of the fixture.
Figure 8:
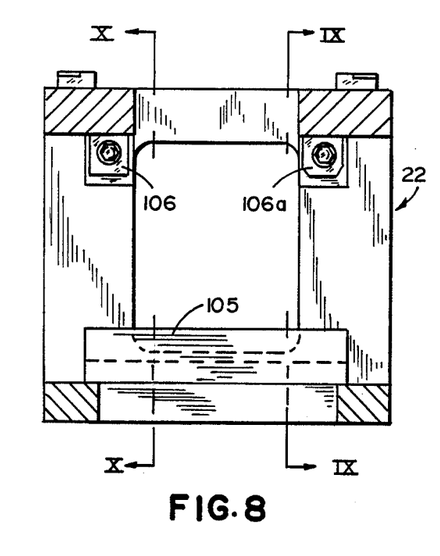
FIG. 8 is a sectional view taken along the plane VIII—VIII of FIG. 3, illustrating the work support clamps installed in the fixture.
Figure 9:
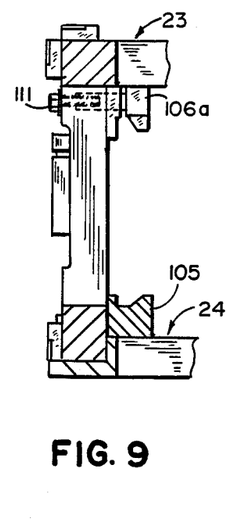
FIG. 9 is a sectional view taken along the plane IX—IX of FIG. 8.
Figure 10:
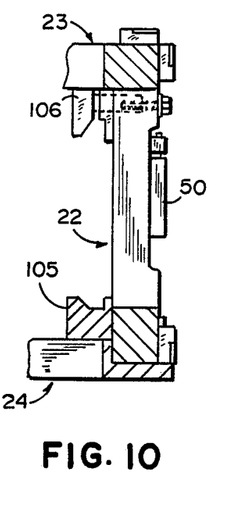
FIG. 10 is a sectional view taken along the plane X—X if FIG. 8.

The indexing and locating means necessary to accurately position the fixture when it is presented before a tool are all mounted on the two panels 22 and 23 of the base member 21. To this end, indexing blocks 50 are mounted, one on each side of the panel 22 (FIG. 6). A second pair of indexing blocks 50a is mounted to the panel 23 (FIG. 5). All of the indexing blocks are identical in construction, each having a tapered or frustoconical locator opening 51 and openings for four bolts for securing the block to the panel. In addition, at one end of each of the blocks, a first stop 52 is secured to the panel by means of dowels 53 and a bolt 54 to the face panel 22. Next to an adjacent side of the indexing blocks a second stop 56 is secured by dowels 57 and a bolt 58. The second stop is located between the indexing pad and the edge of the window 40. The four bolts 59 for securing each of the blocks to the fixture are provided with slightly oversize holes whereby the exact position of the locator opening 51 in each block can be precisely centered on a line which represents a plane parallel to the ends of the panel 22 and perpendicular to the side faces adjacent the blocks and passing through the geometric center A of the fixture. For the purpose of precisely positioning the block so that the center of the locator opening is bisected by this plane, shims 60 are placed between the first stop 52 and the indexing block 50 so that the location is precise for that particular fixture. At the same time, shims 61 are placed between the second stop 56 and the adjacent indexing block to so position it that the center of the locator openings on each side of the panel are equally spaced from a plane parallel to these fixture sides and passing through the geometric center A of the fixture. Once each of the indexing blocks 50 has been so located, the bolts 62 and 63 are tightened to lock the shims in place and the bolts 59 are tightened to secure the blocks to the panel. By this arrangement, each of the blocks is precisely located with a high degree of accuracy which, once established, will remain permanently with the fixture and, under normal operating circumstances, will not require any service other than periodic checking throughout the life of the fixture. The identical procedure is performed with respect to the indexing blocks 50a.

At the four corners of each of the panels 22 and 23 a registry plate 65 is mounted. Each of the registry plates is rigidly bolted to the base member 21 and has a raised locator pad 66. After the registry plates at all four corners of each of the panels have been finally mounted, the faces of the locator pads are ground so that all of them are equidistant from a parallel plane passing through the geometric center A of the fixture. For example, the faces of the pads 66a for the registry plates 65a on the panel 23 are ground to be precisely and equally spaced from the plane Y which passes through the centers of the locator openings 51 (see FIG. 6). In like manner, the pads 66 of the registry plates 65 on the panel 22 are ground to be equally and precisely spaced from the plane X which passes through the centers of the locator openings 51a (see FIG. 5). It will noted that in the preferred construction of the fixture cage the portions of each panel which mount the indexing blocks 50 and 50a are recessed slightly below the surfaces on which the registry plates 65 and 65a are located, thus, eliminating any possible conflict between the blocks and any structure against which the registry pads contact in locating the cage.

It will be noted that all of the locating devices by which the fixture cage is positioned at a work station are on the two legs of the base member and, thus, are not subject to displacement, such as would occur were any of them located on either of the secondary panels 24 and 25. The ability of the fixture to retain the accuracy of location of these registry plates and the locator openings can be further reinforced by the use of dowel pins 33a, 35a and 39a at each of the joints where the secondary panels 24 and 25 are secured to the base member 21 or to each other (FIG. 3).

Figure 2:
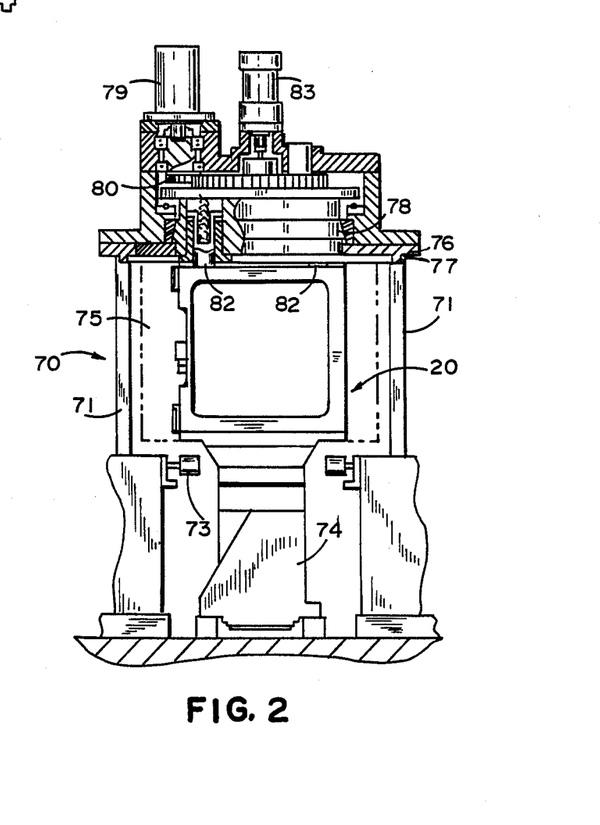
FIG. 2 is a partially broken end view of a typical cell for holding the fixture during machining.

Each of the stations 13 or 14 is equipped with a cell 70 (FIG. 2). Each of the cells has four corner posts 71 forming an internal chamber 75 of a size such that while within the chamber a fixture cage can be rotated about its vertical axis. At each of the chambers the fixture cage 20 leaves its transport means 12 on entering the chamber and within the chamber it is supported on rollers 73. Suitable means (not illustrated) are provided to move the fixture cage the rest of the way into the cell on the rollers 73 and center it in the cell. At that point, the fixture cage is centered over a lift 74. The lift, when activated, will raise the fixture cage off the rollers 73 and move it into engagement with the registry plate 76 at the top of the cell (FIG. 2). The registry plate 76 has a dependent locator ring 77, the bottom surface of which is very accurately positioned such that when the locator pads 66 or 66a of the registry blocks 65 or 65a are pressed against the ring the cage will be precisely horizontal and the geometric center A of the fixture cage will be vertically aligned with a corresponding reference point on the tool or tools at that work station. The registry plate is rigidly mounted on the top of the corner posts 71 and, thus, is fixed in a permanent and precisely located position.

Extending through the registry plate and supported from above is a rotable head plate 78. The head plate can be rotated by the prime mover 79 through the ring and pinion gear power train 80. Mounted within the head plate are a pair of locator pins 82, one of which is illustrated in partial section in FIG. 2 and shown in FIG. 14. The entire head can be raised and lowered by means of the hydraulic cylinder 83. As the head is lowered the pins 82 engage the locator openings 51 of the indexing blocks on the fixture cage. This is done while the locator pads 66 or 66a are positioned close to but out of contact with the ring 77. In so doing, the pins 82 precisely locate the fixture cage circumferentially and, thus, index it about the geometric center of the fixture such that the reference planes X or Y, as the fixture cage is illustrated in FIGS. 5 and 6, passes through a predetermined reference point on the tool at the work station. Thus, the fixture cage's position is accurately and precisely located whereby the tools at any work station will be accurately aligned with their targets on the workpiece mounted within the fixture cage. Once the fixture cage has been positioned circumferentially, the ram 75 is activated to raise the cage the last increment of lift seating the locator pads 66 firmly against the ring 77. When a different one of the then vertical faces of the fixture cage is to presented to the tools, the ram is lowered just enough to eliminate contact between the locator pads 66 and the ring 77 and the cage is rotated to a precisely predetermined rotational position which may be an exact 90° or 180° or it may be rotated to an angular position which is more or less than either of these positions so that the part within the fixture cage is properly referenced to the tool which is to machine the target then positioned in front of it.

If the workpiece includes a target which, during the machining of other targets on the same workpiece, is so located that it is accessible only through the top or bottom panel, the fixture cage is moved out of the cell and rotated 90° about its X axis (as the fixture cage is illustrated in FIGS. 5, 6 and 7). This is done at a rollover station 17 (FIG. 1). After being rotated 90° it is reentered into the cell and the same positioning procedure is followed using the geometric center A as the reference point. All of this is described in greater detail in our co-pending application Ser. No. 637 861, reference to which is made above.

Figure 12:
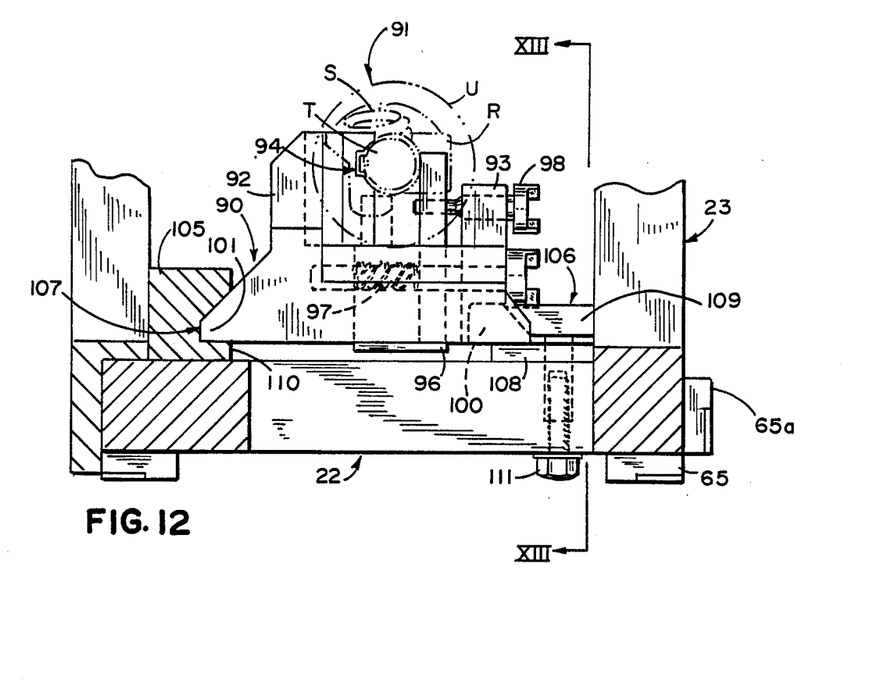
FIG. 12 is a sectional view illustrating a typical mounting of a workpiece within the fixture.
Figure 13:
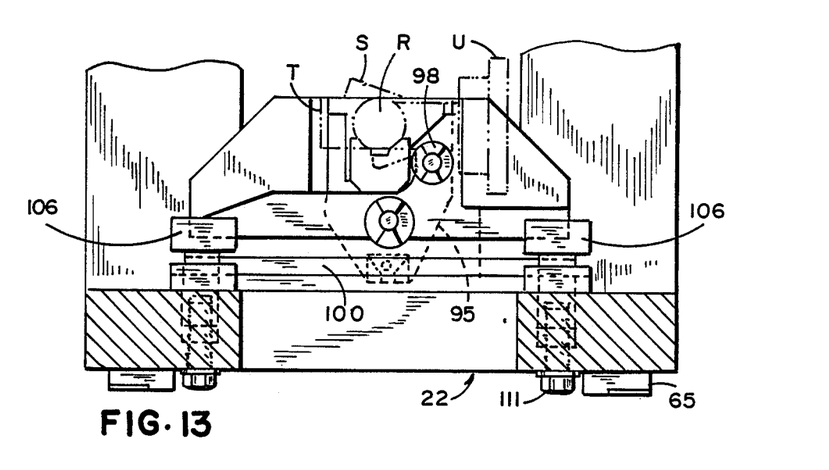
FIG. 13 is a sectional view taken along the plane XIII—XIII of FIG. 12.

To secure a workpiece within the fixture cage, it is necessary to provide each particular workpiece with a support or mounting frame. Each workpiece of a different design requires creation of a support or mounting frame designed to accommodate the particular characteristics of the workpiece. Thus the frame has to be custom made to accommodate the particular workpiece or part it is to support since each particular part design presents different problems of support and has differently located targets for machining. An exemplary mounting frame 90 is illustrated in FIGS. 12 and 13. In this case, the mounting frame is designed to support a part 91 having at least targets R, S, T and U to be machined. The frame includes a saddle 92 and a clamp 93 which presses the part against the saddle 92 to secure it in place. These, of course, have to be custom designed for the particular part involved as is evident from the saddle 92 which has a recess 94 to seat a boss on the part. The clamp can have many particular designs but, as illustrative of a design suitable for this particular part, the clamp 93 has a plate 95, the lower end of which is pressed against the stop 96 by the spring 97. The clamp is tightened by the bolt 98. The saddle and the clamp structure are all supported in a rigid framework 90, the lower end of which has outwardly and oppositely extending wedge-shaped feet 100 and 101. One of the feet is seated in the fixed anchor block 105 and the other is seated in the clamp block 106. The anchor block 105 has a wedge-shaped pocket 107 to receive the foot 101. This block is permanently and rigidly secured to the inside face of one of the legs of the member 21. The clamp block 106 consists of a base element 108 and a wedge-shaped camming block 109. A pair of the clamp blocks 106 are provided spaced apart basically the width of the interior of the fixture cage (FIG. 13). The anchor block also has a base element 110 of the same thickness as the base element 108 so that the framework 99 will be seated parallel to the side panel of the fixture cage when it is seated in position. With the framework seated in the anchor block and pressed tightly into the socket 107, the clamps 106 are closed by tightening the bolts 111 (FIG. 11). Because the camming block has a wedge-shaped surface, it tends to urge the framework against the anchor block 105, thus, making the end wall of the socket 107 an accurate reference point for positioning the frame 90 within the member 21. Once this has been done, and the position of the part checked with respect to the central reference point, that being the geometric center A of the fixture cage, the part is ready for machining and as soon as it has been machined, the finished part can be removed by loosening the clamp 93 and a like part seated in the framework and processed through the machining system without the necessity for further checking since the fixture cage provides such a high degree of repeatability of location of the workpiece with respect to the indexing devices, those being the locator openings 51 or 51a and the registry plates 65 or 65a.

It will be observed from FIGS. 12 and 13 that the machine targets on the particular part mounted in the fixture gauge do not have to be on or aligned with any of the reference planes X, Y or Z. What is important is that in designing the framework 90, care will be taken to determine exactly where each of the targets to be machined is located in relation to the geometric center A of the fixture cage. Thus, it can be determined with great accuracy exactly where the tool must be at the work station which is to do the machining on a particular target. By this technique all measurements, vertical, horizontal and angular are determined from a single known reference point which, by means of the structure of the cell, can be accurately indexed at every work station to the tools which are to work on the part. The use of a single reference point rather than multiple reference points eliminates a major cause of tolerance accumulation. Thus, accurate reproduction of results can be attained from one part to another and also with respect to each of the different machining operations to be carried out on the same part.

Figure 15:
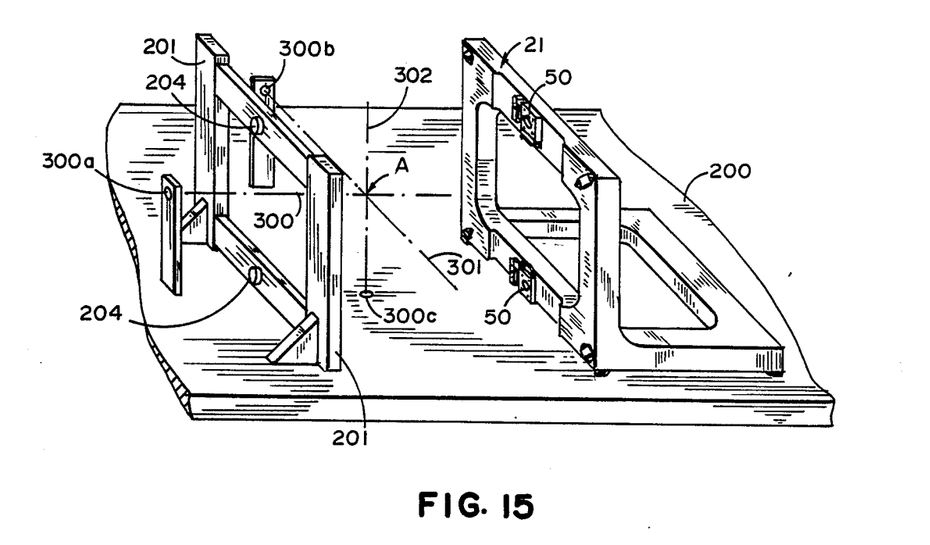
FIG. 15 is an oblique view of a station for preparing the fixture cage for use.

One method of preparing the fixture cage for use, is illustrated in FIG. 15. In this case, the base member 21 is placed on a specially built surface 200 which is part of a preparatory station. A pair of rigid pillars 201 are provided at the station. The member 21 rests on one set of the registry blocks 65 or 65a bearing on the surface of the platform and the other set of registry blocks are seated against the pillar stops 201. For the sake of clarity the fixture is illustrated separated from the positioning means used to locate a part within it. It will be understood that the work of equipping it with a work holding frame 90 will be done while the base member of the fixture is firmly clamped to the pillars 201 but any suitable means, which means is not illustrated. The pillar stops are connected by cross bars which mount a pair of spring loaded indexing plungers 204 identical in size and shape to the locator pins 82 used at the cell 70. The indexing plungers engage a pair of the locator openings 51. Thus, the member is brought into exact registry with respect to a point in space A which represents the geometric center of the fixture cage. This point can be visually identified by suitable means such as low power laser beams 300, 301 and 302 generated by suitable sources such as 300a, 300b and 300c. The framework 90 can then be designed to position the work with relation to point A in space. Once the workpiece supporting frame has been designed and built to hold the part in a particular spacial relationship to the geometric center and thus to both the locator blocks and to the registry pads, it can be locked in the fixture cage. Thereafter, while the base member is still in the preparatory station, a part is placed in it to check the accuracy of the framework and determine that it does, in fact, position the part exactly where it should be placed in order to produce a precisely machined art. Before the base member and part supporting framework assembly are removed from the station, the secondary panels 24 and 25 are assembled to complete the fixture cage. The finished fixture cage is then once more checked for accuracy and any unexpected distortion which might have occurred as a result of the final assembly of the fixture is corrected. It will be recognized that additional devices can be used to help in the design and accuracy check of the work done when each fixture cage is first being prepared for use. Thereafter, from time to time, this same preparatory station can be used to check the continuing accuracy of the fixture cage and the framework. In addition to such devices as laser beams, mechanical measuring means, such as micrometers and the like, can be used to determine the relative position of each of the targets to be machined with respect to the geometric center of the cage.

What has been described is the preparatory set up for machining a part in the fixture cage. It will be recognized that once this work has been completed, this procedure need not be repeated, because once the fixture cage and framework have met the prescribed tests for accuracy, subsequent work on them should be limited to periodic accuracy checks.

Having described a preferred embodiment of the invention it will be recognized that additional embodiments can be made without departing from the principles of the invention. Such modifications are to be considered as included in the claims, unless the claims, by their express language, state otherwise.

We claim:

1. A fixture for supporting work pieces for automated machining, said fixture being cuboidal in shape and providing tool access on a plurality of sides, said fixture having a rigid primary body member having a pair of legs arranged at right angles to each other and forming two panels of the fixture; a second body member forming a third panel of said fixture; a third body member forming a fourth panel of said fixture; means detachably connecting said second and third body members to each other and to said primary body member for reinforcing said primary body member; work holder clamping means mounted on the inner face of one of the panels of said primary body member adjacent one edge thereof; work holder stop means mounted on the inner face of the same panel and adjacent an edge thereof opposite from said clamping means; said clamping means and stop means being the only means of locating and anchoring a workpiece to the fixture; locating and indexing means mounted on the exterior face of each of the legs of said primary body member and providing the only locating and positioning means for the fixture, said locating and indexing means being precisely spaced from the geometric center of the cuboidal fixture, said stop means being precisely located with respect to said locating and indexing means.

2. A fixture as described in claim 1 wherein said clamp means is adjacent the end of said leg integral with the other leg.

3. In a cuboidal fixture for work pieces, means for locating said fixture with respect to each tool which is to machine the work piece, said means including a pair of registry blocks each having a locator pin receiving opening therein, said blocks being secured to the same exterior face of said fixture adjacent opposite sides of said face, a pair of anchor members arranged on two adjacent sides of each of said registry blocks and rigidly secured to said fixture, means for fixing the position of each of said blocks after the blocks have been precisely positioned with respect to the geometric center of said fixture, said means filling any space between the anchor members and the registry block and rigidly securing each of said registry blocks to both of the anchor members adjacent to it; fastener means securing said registry blocks to said fixture; whereby the locator pin receiving opening in each of the blocks is precisely located with respect to the geometric center of the fixture.

4. The cuboidal fixture recited in claim 3 wherein the means for fixing the position of each of the registry blocks is a bonding agent.

5. The cuboidal fixture recited in claim 3 wherein the means for fixing the position of each of the registry blocks are shims.

6. The cuboidal fixture recited in claim 3 wherein a second pair of said registry blocks are provided on an adjacent face of said fixture; the blocks of each pair on each face having precisely the same spacing from each other and from the geometric center of the fixture.

7. The method of preparing a cuboidal fixture for receiving workpieces for machining including the steps of providing a fixture member having a pair of square panels each having thereon contact pads having surfaces in a common plane and locator openings in each panel precisely located with respect to the geometric center of the panel, the panels being permanently joined whereby said fixture member is L-shaped and the two sides of which are identical, securing to one of said panels means for detachably anchoring a workholder, using the surfaces of said contact pads as reference stops determining the point of intersection of a pair of axes, each one of which is normal to the plane of a different one of said panels and passes through the geometric center of the panel, while said point of intersection is accessible from all sides except those occupied by said two panels designing a support adapted to be gripped by said anchoring means which support will hold a selected workpiece in a position in which all machining targets thereon are positioned in a precisely known relationship to said point of intersection, securing a support incorporating the design information thereby acquired to said anchoring means, providing a second pair of panels identical in size and shape to said first pair of panels and attaching them to said fixture member to form a fixture of cuboidal shape with a precisely located workpiece support therein.

* * * * *